United States Patent
Tang et al.

(10) Patent No.: US 11,086,866 B2
(45) Date of Patent: Aug. 10, 2021

(54) METHOD AND SYSTEM FOR REWRITING A QUERY

(71) Applicant: Yahoo Holdings, Inc., Sunnyvale, CA (US)

(72) Inventors: Jiliang Tang, San Jose, CA (US); Dawei Yin, San Jose, CA (US); Hongbo Deng, San Jose, CA (US); Tim Daly, San Jose, CA (US); Chao Tan, Sunnyvale, CA (US); Jean-Marc Langlois, Menlo Park, CA (US); Yi Chang, Sunnyvale, CA (US)

(73) Assignee: Verizon Media Inc., New York, NY (US)

( * ) Notice: Subject to any disclaimer, the term of this patent is extended or adjusted under 35 U.S.C. 154(b) by 395 days.

(21) Appl. No.: 15/130,217

(22) Filed: Apr. 15, 2016

(65) Prior Publication Data
US 2017/0300530 A1 Oct. 19, 2017

(51) Int. Cl.
*G06F 16/2453* (2019.01)
*G06N 20/00* (2019.01)
*G06F 16/2457* (2019.01)

(52) U.S. Cl.
CPC .. *G06F 16/24534* (2019.01); *G06F 16/24578* (2019.01); *G06N 20/00* (2019.01)

(58) Field of Classification Search
CPC .......... G06F 17/30448; G06F 17/3053; G06F 17/30864; G06F 17/30867; G06N 99/005
USPC ....................................................... 707/723
See application file for complete search history.

(56) References Cited

U.S. PATENT DOCUMENTS

| | | | | |
|---|---|---|---|---|
| 2008/0319962 A1* | 12/2008 | Riezler | ............... | G06F 16/3338 |
| 2009/0327264 A1* | 12/2009 | Yu | ........................ | G06F 16/951 |
| 2010/0094855 A1* | 4/2010 | Rouhani-Kalleh | | ........................ |
| | | | | G06F 16/3325 |
| | | | | 707/706 |
| 2011/0131157 A1* | 6/2011 | Iyer | ................... | G06Q 30/0251 |
| | | | | 706/12 |
| 2012/0254217 A1* | 10/2012 | Ali | .................... | G06F 17/30864 |
| | | | | 707/765 |
| 2013/0103493 A1* | 4/2013 | Gao | .................. | G06Q 30/0241 |
| | | | | 705/14.46 |
| 2013/0262351 A1* | 10/2013 | Garg | .................... | G06K 9/6256 |
| | | | | 706/12 |
| 2014/0156633 A1* | 6/2014 | Duan | ................ | G06F 16/24545 |
| | | | | 707/713 |
| 2014/0330804 A1* | 11/2014 | Bao | ..................... | G06F 16/3338 |
| | | | | 707/706 |
| 2016/0078086 A1* | 3/2016 | Nowak-Przygodzki | | ..................... |
| | | | | G06F 17/30448 |
| | | | | 707/723 |

(Continued)

*Primary Examiner* — Hosain T Alam
*Assistant Examiner* — Nicholas E Allen
(74) *Attorney, Agent, or Firm* — Pillsbury Winthrop Shaw Pittman LLP

(57) ABSTRACT

The present teaching relates to rewriting a query and providing search results. In one example, a plurality of queries is obtained. For each of the plurality of queries, one or more search results are identified. The one or more search results have been obtained in response to the query and have been previously selected by a user submitting the query. A plurality of titles is obtained. Each of the titles corresponds to one of the one or more search results with respect to one of the plurality of queries. A model is generated based on the plurality of queries and the plurality of titles. The model is to be used for rewriting a query.

20 Claims, 16 Drawing Sheets

(56) References Cited

U.S. PATENT DOCUMENTS

2017/0300530 A1* 10/2017 Tang ................ G06F 17/30448

* cited by examiner

FIG. 5

| | Translated Phrase 1: | Translated Phrase 2: | Translated Phrase 3: | ... | Translated Phrase N: |
|---|---|---|---|---|---|
| Original Phrase 1: | $Score_{11}$ | $Score_{12}$ | $Score_{13}$ | ... | $Score_{1N}$ |
| Original Phrase 2: | $Score_{21}$ | $Score_{22}$ | $Score_{23}$ | ... | $Score_{2N}$ |
| Original Phrase 3: | $Score_{31}$ | $Score_{32}$ | $Score_{33}$ | ... | $Score_{3N}$ |
| Original Phrase 4: | $Score_{41}$ | $Score_{42}$ | $Score_{43}$ | ... | $Score_{4N}$ |
| ... | ... | ... | ... | ... | ... |
| Original Phrase M: | $Score_{M1}$ | $Score_{M2}$ | $Score_{M3}$ | ... | $Score_{MN}$ |

FIG. 6

METHOD AND SYSTEM FOR REWRITING A QUERY

BACKGROUND

1. Technical Field

The present teaching relates to methods, systems, and programming for Internet services. Particularly, the present teaching is directed to methods, systems, and programming for rewriting a query and providing search results.

2. Discussion of Technical Background

Online search, usually conducted through search engines, is a process of interactively searching for and retrieving requested information via a search application running on a local user device, such as a computer or a mobile device, from online databases. Online users can play two roles with respect to commercial search engines. The users are not only information creators that generate web documents, but also information consumers that retrieve documents for their information needs. Hence, web documents and queries often involve with different language styles and vocabularies, which can make search engines unable to retrieve documents matching queries even when queries can perfectly describe users' information needs.

Query rewriting is a task of altering a given query to another query that can be recognized by search engines and has been proven to be effective in improving search performance. However, existing query rewriting techniques need to split the query writing problem into many sub-problems and develop a rewriter for each sub-problem. There is no existing unified solution to the problem of query rewriting.

Therefore, there is a need to provide an improved solution for query rewriting to solve the above-mentioned problems.

SUMMARY

The present teaching relates to methods, systems, and programming for Internet services. Particularly, the present teaching is directed to methods, systems, and programming for rewriting a query and providing search results.

In one example, a method, implemented on a machine having at least one processor, storage, and a communication platform capable of connecting to a network for rewriting a query is disclosed. A plurality of queries is obtained. For each of the plurality of queries, one or more search results are identified. The one or more search results have been obtained in response to the query and have been previously selected by a user submitting the query. A plurality of titles is obtained. Each of the titles corresponds to one of the one or more search results with respect to one of the plurality of queries. A model is generated based on the plurality of queries and the plurality of titles. The model is to be used for rewriting a query.

In a different example, a method, implemented on a machine having at least one processor, storage, and a communication platform capable of connecting to a network for providing search results is disclosed. An original query is received for online content. A first set of search results is generated based on the original query. A rewritten query is obtained. The rewritten query is generated based on the original query and a model. The model is generated based on a plurality of query-title pairs each of which includes a query and a title corresponding to a search result. The search result has been previously selected by a user submitting the query. A second set of search results is generated based on the rewritten query. A combined list of search results is generated based on the first set of search results and the second set of search results. The combined list of search results is provided in response to the original query.

In another example, a system having at least one processor, storage, and a communication platform connected to a network for rewriting a query is disclosed. The system comprises: a click graph generator/updater configured for obtaining a plurality of queries and identifying, for each of the plurality of queries, one or more search results that have been previously selected by a user submitting the query, wherein the one or more search results have been obtained in response to the query; a query-title pair generator configured for obtaining a plurality of titles, wherein each of the titles corresponds to one of the one or more search results with respect to one of the plurality of queries; and a query rewrite model learner configured for generating a model based on the plurality of queries and the plurality of titles, wherein the model is to be used for rewriting a query.

Other concepts relate to software for implementing the present teaching on rewriting a query. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for rewriting a query is disclosed. The information, when read by the machine, causes the machine to perform the following: obtaining a plurality of queries; identifying, for each of the plurality of queries, one or more search results that have been previously selected by a user submitting the query, wherein the one or more search results have been obtained in response to the query; obtaining a plurality of titles, wherein each of the titles corresponds to one of the one or more search results with respect to one of the plurality of queries; and generating a model based on the plurality of queries and the plurality of titles, wherein the model is to be used for rewriting a query.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 illustrates exemplary web pages each of which has a title, according to an embodiment of the present teaching;

FIG. 6 illustrates an exemplary table built for query rewriting, according to an embodiment of the present teaching;

DETAILED DESCRIPTION

Figure 1:
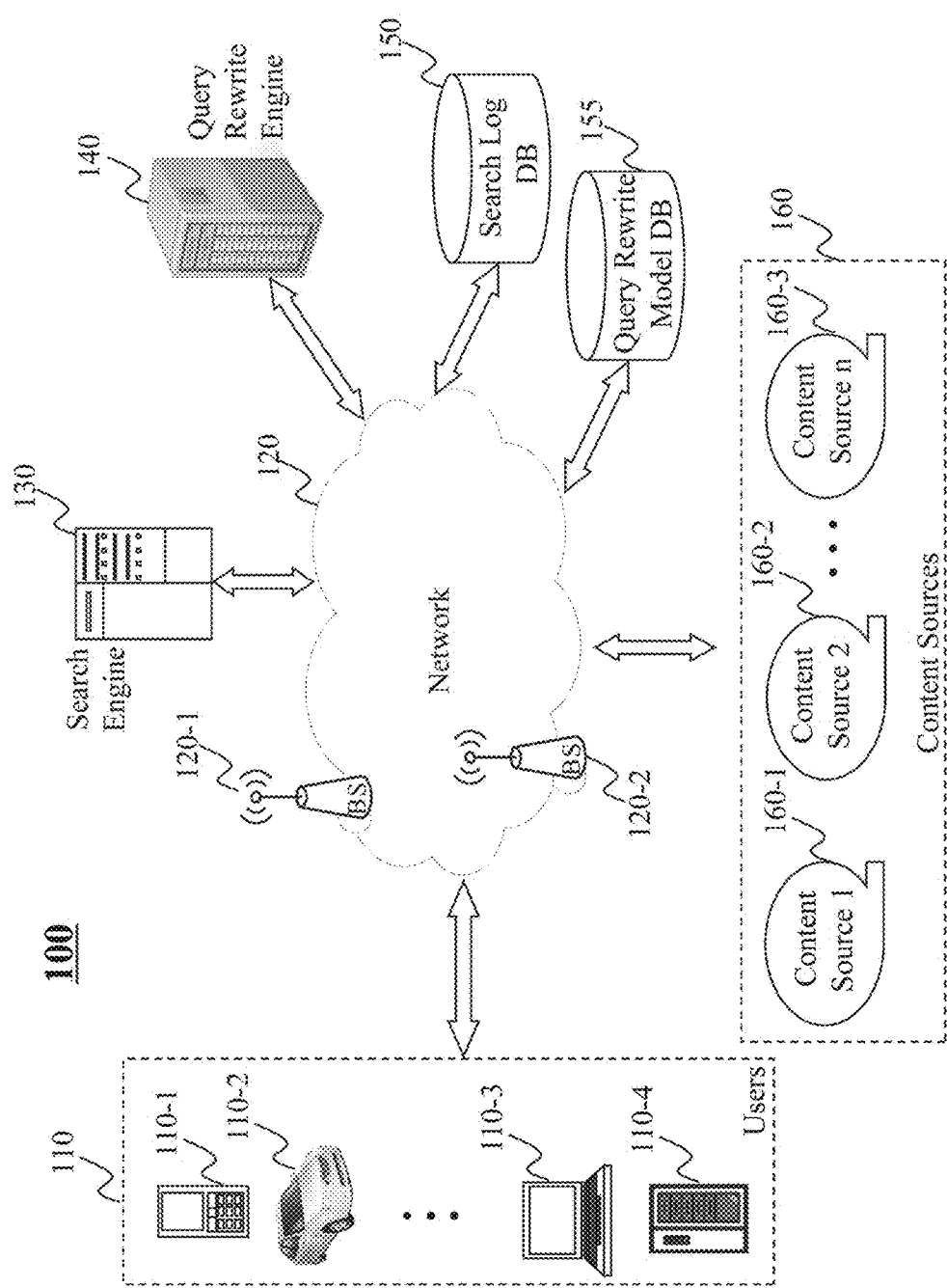
FIG. 1 is a high level depiction of an exemplary networked environment for query rewriting, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficiently and effectively rewriting a query and providing search results. The method and system as disclosed herein aim at improving an online user's search experience by rewriting a query submitted by the user to another query that can better reflect the user's search intent and lead to search results better meeting the user's need.

Web documents often involve with different language styles and vocabularies than those of queries. For example, a user submits a query "how much tesla", while web documents usually use the expression "price tesla". As such, there is a need to rewrite a given query to another query that can be recognized by search engines. Unlike existing query rewrite works that split the query writing problem into many sub-problems and develop a rewriter for each sub-problem, the present teaching discloses a unified solution to the problem of query writing.

According to one embodiment of the present teaching, query rewriting may be treated as a machine translation problem which translates from a source language of user queries S into a target language of web documents T. In other words, the disclosed system can use query rewriting to bridge the language gap between queries and documents for search engines. The proposed framework for query rewriting may include of two phases: (1) the learning phase that learns the phrase-level translations from queries to documents; and (2) the decoding phase that generates candidates for a given query.

A challenge for the learning phase is to obtain a large parallel training data with user-submitted queries and corresponding rewritten queries that search engines can recognize. It is difficult, if not impossible, to use human labeling for the training data due to (a) time and effort consuming; and (b) the language gap between user language S and search engine language T. To tackle this challenge, one can make use of click-through graphs. A click-through graph or a click graph may be a bipartite weighted graph that includes queries and documents as nodes, where edges connecting the nodes indicate co-clicks between queries and documents, and weights associated edges are co-click numbers. Typically, titles of documents are very informative and representative, and shorter than body texts. Queries are usually very short as well. As such, titles are more similar to queries than body texts. Therefore, one can consider titles of documents as rewritten queries that search engines can recognize.

The disclosed system in the present teaching can extract query-title pairs from click-through graphs. Each query-title pair here includes a query previously submitted by a user and a title of a document selected by the user in response to the query. As such, each query-title pair may represent a good exemplary pair of a user-submitted query and a rewritten query that a search engine can recognize. Since it is highly possible to collect a click-through graph with millions of queries and titles, the system can obtain a very large-scale parallel training data for the learning phase. With query-title pairs, the disclosed system may train a query rewriting model, e.g. by word alignment, phrase extraction and phrase scoring.

In a decoding phase, the disclosed system may use the query rewriting model to generate one or more rewritten queries for a user-submitted query, e.g. by translating the phrases in the query into other phrases based on the model. Given a query q, there could be many ways to segment it into phrases. Meanwhile, each phrase could have many translations. Hence, there could be hundreds of rewritten candidates. In one embodiment, the goal of the decoding phase is to generate the most confident candidate $q_w$. Each possible candidate $q_c$ may be scored, e.g. via a linear combination of predefined feature functions. The disclosed system can adopt widely feature functions including translation scores provided by the learning phase, language model of original queries, word penalty, phrase penalty, distortion, etc. In addition, the disclosed system may also use feature functions specific to the query rewriting problem to rank the rewritten candidates. These specific feature functions include a similarity penalty which controls the word-level similarity between the candidate and the query; a length penalty which controls the length of the candidate; and a stop-word penalty which controls the number of stop-words like "a, an, the" in candidates.

In addition, the present teaching also discloses different ranking criteria to combine search results generated from both the original query and the corresponding rewritten query.

Compared to existing query rewriting methods, the query rewriting model disclosed in the present teaching is more flexible, scalable, effective, and robust. The disclosed system herein is able to bridge the semantical gap between queries and web documents. The proposed framework here may significantly improve the search relevance and increase users' online search experience.

The terms "click-through graph" and "click graph" may be used interchangeably herein. The terms "query rewrite" and "query rewriting" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for query rewriting, according to an embodiment of the present teaching. In FIG. 1, the exemplary networked environment 100 includes one or more users 110, a network 120, a search engine 130, a query rewrite engine 140, a search log database 150, a query rewrite model database 155, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. The network 120 may also include various network access points, e.g., wired or wireless access points such as base stations or Internet exchange points 120-1 ... 120-2, through which a data source may connect to the network 120 in order to transmit information via the network 120.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the search engine 130 and the query rewrite engine 140 through wired or wireless technologies and related operating systems implemented within user-wearable devices (e.g., glasses, wrist watch, etc.).

A user, e.g., the user 110-1, may send a query to the search engine 130 via the network 120 and receive search results from the search engine 130. The search engine 130 may determine whether the query needs to be rewritten. If so, the search engine 130 may communicate with the query rewrite engine 140 to rewrite the query and generate the search results based at least partially on the rewritten query.

The search engine 130 may store information into the search log database 150 via the network 120. The information in the search log database 150 may be generated by one or more different applications (not shown), which may be running on the search engine 130, at the backend of the search engine 130, or as a completely standalone system capable of connecting to the network 120, accessing information from different sources, analyzing the information, generating structured information, and storing such generated information in the search log database 150. The search log database 150 may include search logs of different users of the search engine 130. The search engine 130 may generate search results based on an original query submitted by a user and/or a rewritten query obtained from the query rewrite engine 140 and generated based on the original query. According to various embodiments, the search engine 130 may combine search results generated based on the two queries with different ranking criteria.

The query rewrite engine 140 may create and update a query rewrite model based on parallel training data generated based on the information from the search log database 150. For example, the query rewrite engine 140 may generate the parallel training data by generating a plurality of query-title pairs from the search log database 150. Each query-title pair may include a query and a title. The query is previously submitted by a user and stored in the search log database 150. The title is a title of a web document or a URL selected by the user in response to the query. As such, each query-title pair may represent a good exemplary pair of a user-submitted query and a rewritten query that a search engine can recognize. In one embodiment, the query rewrite engine 140 can store the query rewrite model into the query rewrite model database 155, and update the query rewrite model periodically. For example, after some time, there are new data in the search log database 150. The query rewrite engine 140 may then generate a new set of parallel training data from the search log database 150 and generate an updated query rewrite model based on the new set of parallel training data. In another embodiment, the query rewrite engine 140 can generate and store multiple versions of the query rewrite model into the query rewrite model database 155, and update them periodically.

The query rewrite engine 140 may also receive a query rewrite request from the search engine 130 for rewriting an original query submitted by a user. The query rewrite engine 140 may generate a rewritten query based on the original query and the query rewrite model, and send the rewritten query to the search engine 130 for generating search results accordingly. In one embodiment, the query rewrite engine 140 may generate multiple rewritten queries based on one original query and the query rewrite model, and send the multiple rewritten queries to the search engine 130 for generating search results.

The content sources 160 in the exemplary networked environment 100 include multiple content sources 160-1, 160-2 ... 160-3. A content source 160 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search engine 130 may access information from any of the content sources 160-1, 160-2 ... 160-3. For example, the search engine 130 may fetch content, e.g., websites, through its web crawler to build a search index.

Figure 2:
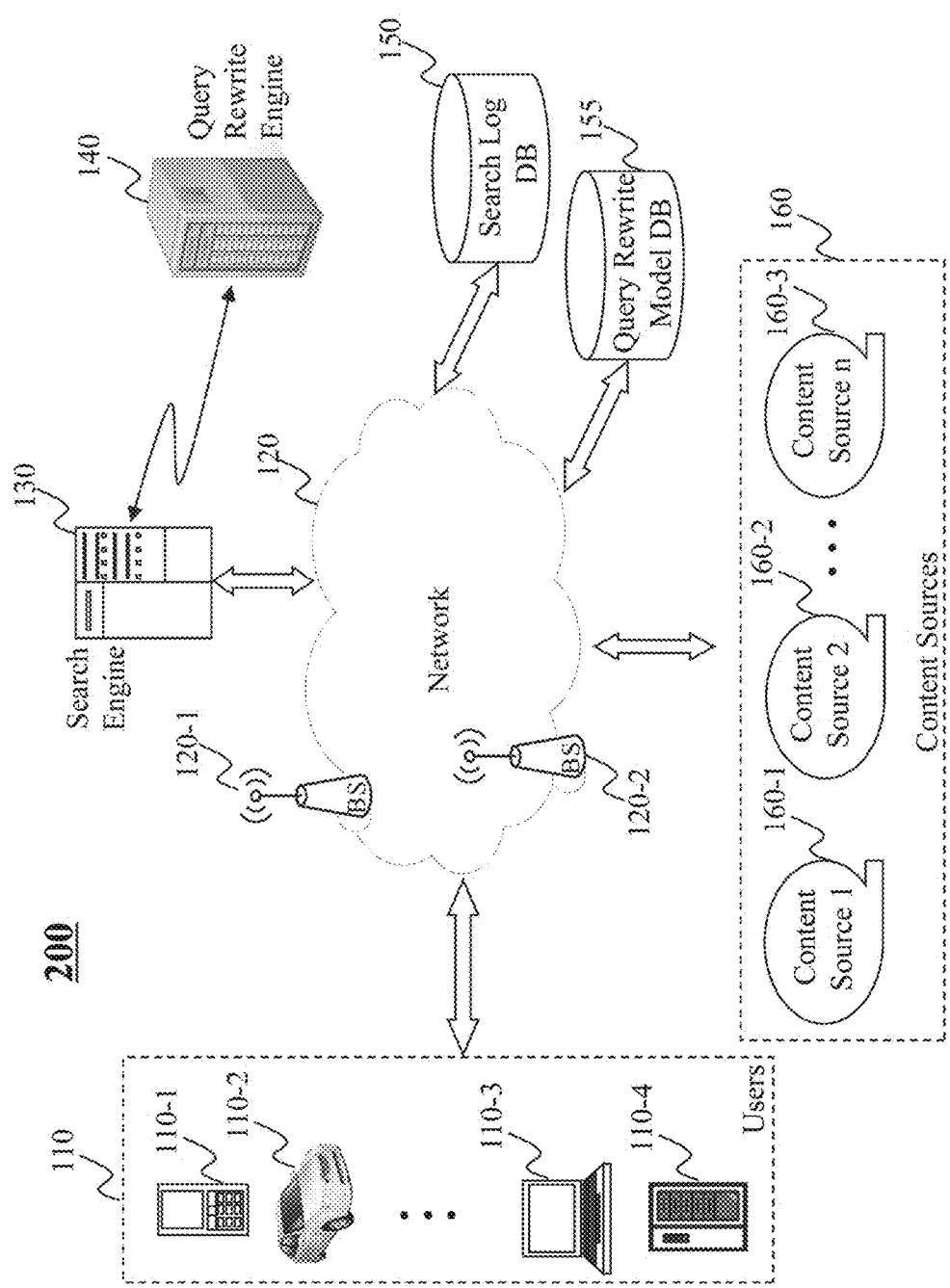
FIG. 2 is a high level depiction of another exemplary networked environment for query rewriting, according to an embodiment of the present teaching.

FIG. 2 is a high level depiction of another exemplary networked environment 200 for query rewriting, according to an embodiment of the present teaching. The exemplary networked environment 200 in this embodiment is similar to the exemplary networked environment 100 in FIG. 1, except that the query rewrite engine 140 serves as a backend system for the search engine 130.

Figure 3:
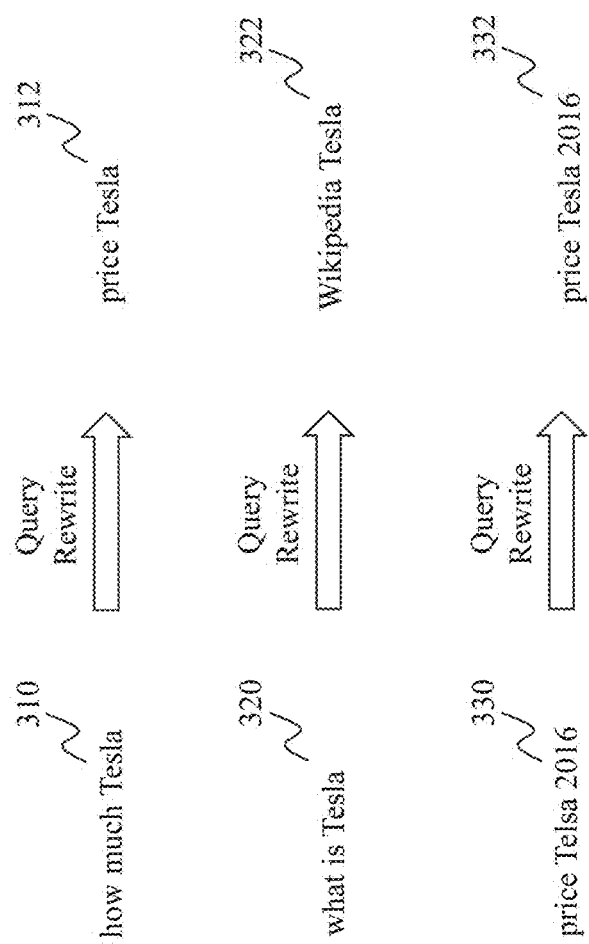
FIG. 3 illustrates some examples of query rewriting, according to an embodiment of the present teaching.

FIG. 3 illustrates some examples of query rewriting, according to an embodiment of the present teaching. As shown in FIG. 3, an original query "how much Tesla" 310 submitted by a user may be rewritten to be "price Tesla" 312. In one example, this may be because some users previously submitting the query "how much Tesla" 310 selected a web document with the title "price Tesla" 312 from the search results. In another example, this may be because many users previously submitting queries in form of "how much XXX" selected web documents with a title in form of "price XXX" from the search results.

FIG. 3 also shows another example, where an original query "what is Tesla" 320 submitted by a user may be rewritten to be "Wikipedia Tesla" 322. In one example, this may be because some users previously submitting the query "what is Tesla" 320 selected a web document with the title "Wikipedia Tesla" 322 from the search results. In another example, this may be because many users previously submitting queries in form of "what is XXX" selected web documents with a title in form of "Wikipedia XXX" from the search results.

In another example shown in FIG. 3, an original query "price Telsa 2016" 330 submitted by a user may be rewritten to be "price Tesla 2016" 332. In one example, this may be because some users previously submitting the query "price Telsa 2016" 330 selected a web document with the title "price Tesla 2016" 332 from the search results. In another example, this may be because many users previously submitting queries including the phrase "Telsa" selected web documents with a title including the phrase "Tesla" from the search results. Although in this case, the original query "price Telsa 2016" 330 may also be rewritten to be "price Tesla 2016" 332 by checking for typos based on a dictionary. The dictionary cannot be used to rewrite all of the three original queries shown in FIG. 3. The disclosed system in the present teaching can use a unified model trained based on query-title pairs to rewrite all of the three original queries as shown in FIG. 3.

Figure 4:
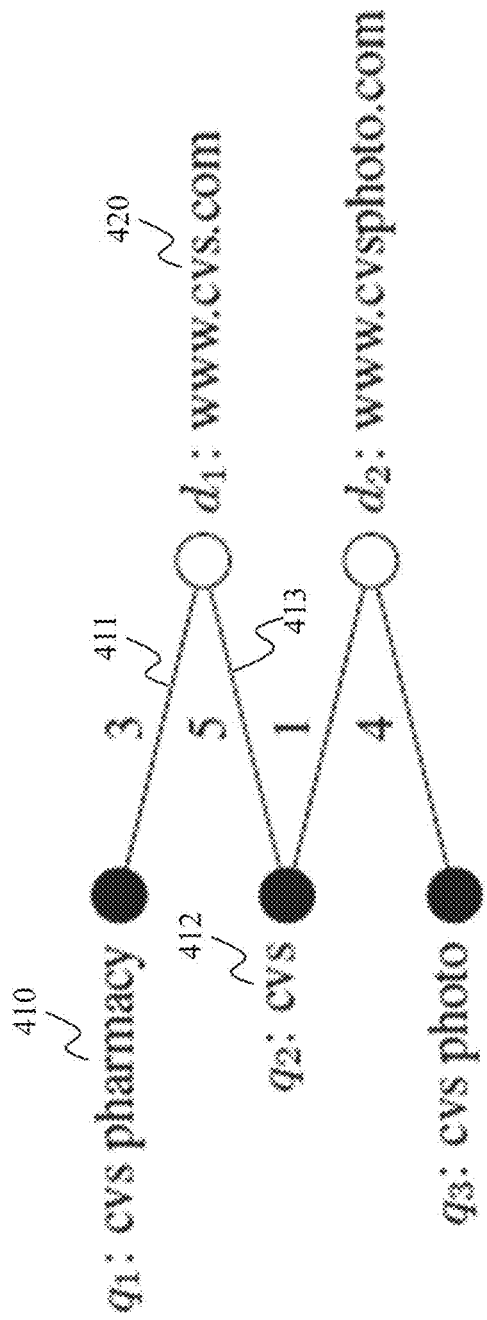
FIG. 4 illustrates an exemplary click graph, according to an embodiment of the present teaching.

FIG. 4 illustrates an exemplary click graph, according to an embodiment of the present teaching. As discussed above, a click graph may be a bipartite weighted graph, that is generated based on one or more search logs, and connects queries and documents by gross judgments from users. The exemplary click graph in FIG. 4 includes nodes, edges connecting the nodes, and weights of the edges. Each node represents a query (e.g. $q_1$: cvs pharmacy 410, $q_2$: cvs 412) or a web document ($d_1$: www.cvs.com 420). Each edge in the click graph links a query and a clicked document. For example, an edge 411 linking the query $q_1$: cvs pharmacy 410 and the document $d_1$: www.cvs.com 420 represents that there is at least one co-click between them, i.e. at least one user previously submitting the query $q_1$: cvs pharmacy 410 has clicked or selected the document $d_1$: www.cvs.com 420 in response to the query. Edges are weighted by the number of clicks. Larger weight means more clicks that may imply more confidence in potential relevance between the query and the document. For example, the edge 411 linking the query $q_1$: cvs pharmacy 410 and the document $d_1$: www.cvs.com 420 has a weight of 3, which means that there have been three times after the query $q_1$: cvs pharmacy 410 is submitted, the document $d_1$: www.cvs.com 420 is selected accordingly. As shown in FIG. 4, a query may be linked to one or more documents; and a document may be linked to one or more queries.

Figure 5:
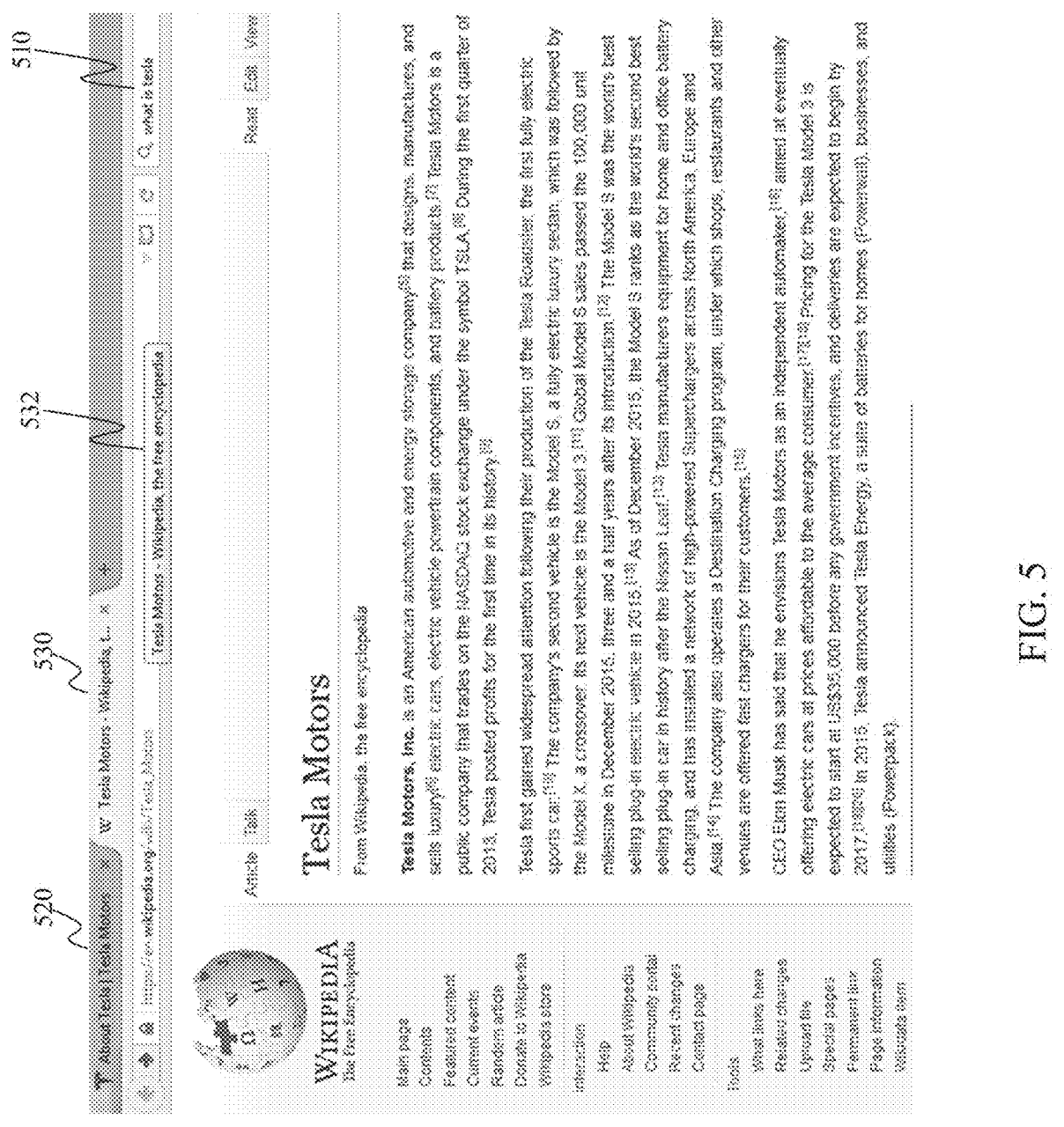

FIG. 5 illustrates exemplary web pages each of which has a title, according to an embodiment of the present teaching. As shown in FIG. 5, after a user submits a query "what is tesla" 510, the user may select one or more web documents from search results generated based on the query. The web documents may include a first web document 520 with a title "About Tesla|Tesla Motors" and a second web document 530 with a title "Tesla Motors—Wikipedia, the free ency-clopedia" 532. For many web browsers, a title of a web document can be shown on the tab bar directly. When a full title is too long to be shown on the tab bar, the full title may be shown like the title 532, after a user puts a mouse pointer on top of the tab bar for some time. Typically, titles of documents are very informative and representative, and shorter than body texts. Queries are usually very short as well. As such, titles are more similar to queries than the body texts themselves. Therefore, the disclosed system can utilize titles of documents as rewritten queries that search engines can recognize.

As discussed above, the relevance between a query and a document can be estimated by the weight of the edge linking the query and the document in a click graph. Because each document can have a corresponding title, the relevance between the query and the document can be used to determine a degree of relevance between the query and the title. As such, a query-title pair is generated with a degree of relevance.

In general, for each query-title pair, the query and the title can each be segmented into one or more phrases. Then based on many query-title pairs, a degree of relevance can be derived for a pair of phrases, i.e. how confident to translate a phrase to another. The disclosed system can train a model based on the query-title pairs, and use the model for query rewriting. In one embodiment, the model may be utilized in form of a table for translating a phrase to another with a score.

FIG. 6 illustrates an exemplary table 600 built for query rewriting, according to an embodiment of the present teaching. As shown in FIG. 6, each row in the table 600 represents an original phrase; and each column in the table 600 represents a translated phrase. For a given pair of original phrase and translated phrase, a score is assigned in the table 600 to represent a confidence or probability to rewrite the original phrase to the translated phrase. In one embodiment, the score may be determined based on a degree of relevance associated with each query-title pair in the parallel training data, which may depend on the weights of the edges as shown in FIG. 4.

Figure 7:
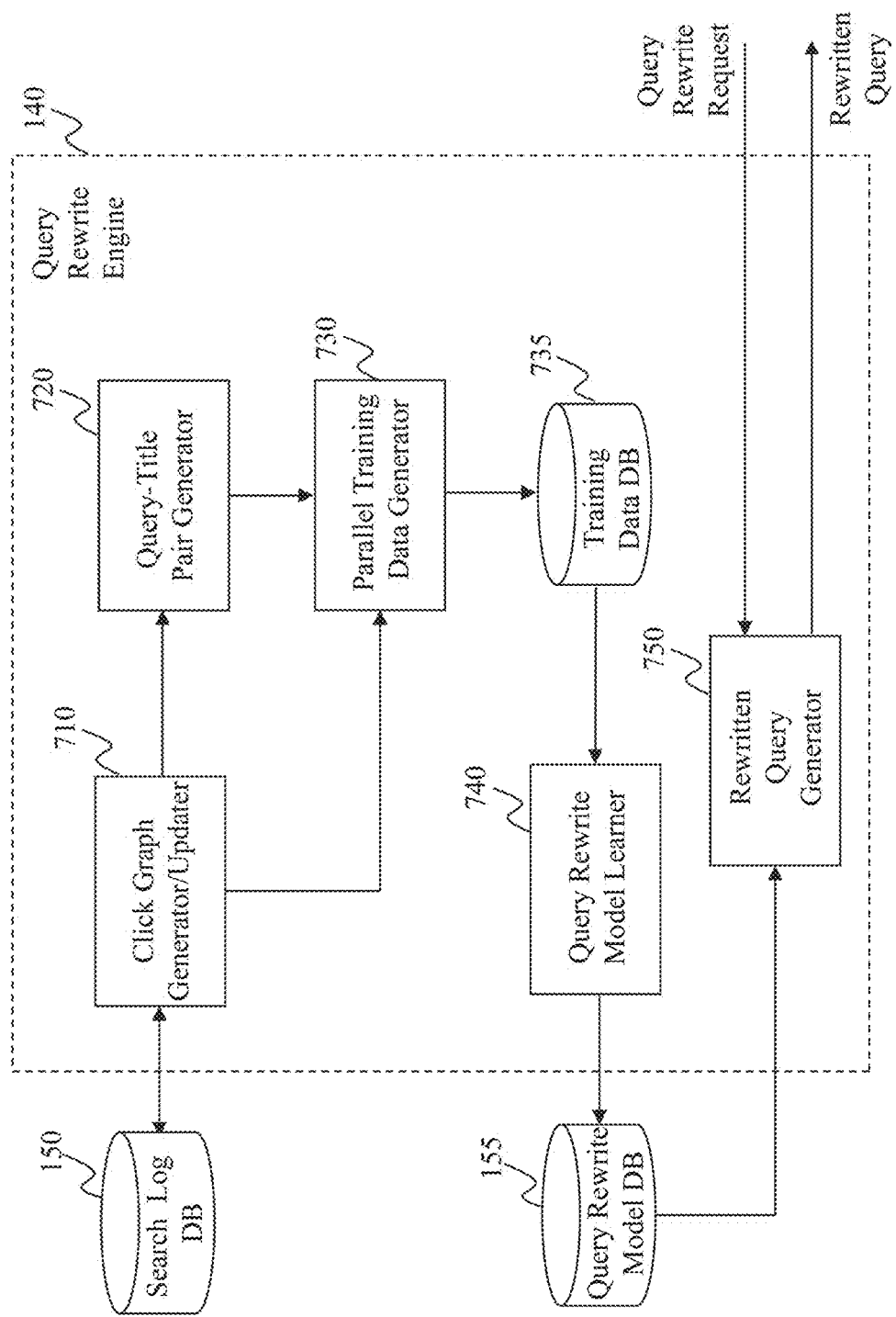
FIG. 7 illustrates an exemplary diagram of a query rewrite engine, according to an embodiment of the present teaching.

FIG. 7 illustrates an exemplary diagram of a query rewrite engine 140, according to an embodiment of the present teaching. The query rewrite engine 140 in this example includes a click graph generator/updater 710, a query-title pair generator 720, a parallel training data generator 730, a training data database 735, a query rewrite model learner 740, and a rewritten query generator 750.

The click graph generator/updater 710 in this example generates and updates a click graph based on information in the search log database 150. A search log in the search log database 150 may record information related to a search engine, e.g. user queries received at the search engine, search results sent by the search engine, user interactions with the search results and the search engine, and relationships among them. Based on the search logs in the search log database 150, the click graph generator/updater 710 may generate a click graph to indicate relationships between queries and documents, as shown in FIG. 4. The click graph generator/updater 710 may periodically update the click graph based on new information recorded in the search log database 150. In one embodiment, the click graph generator/updater 710 may store the click graph in the query rewrite engine 140. In another embodiment, the click graph generator/updater 710 may send the click graph to the query-title pair generator 720 for generating query-title pairs, and to the parallel training data generator 730 for generating parallel training data.

The query-title pair generator 720 in this example may obtain the click graph from the click graph generator/updater 710 and generate a plurality of query-title pairs based on the click graph. As discussed above, the click graph may represent relationships between queries and documents. As shown in FIG. 5, each of the documents can have a corresponding title that represents the document or a URL corresponding to a search result generated in response to a corresponding query. As such, the query-title pair generator 720 may put the corresponding query and the corresponding title into a pair, to generate a query-title pair. The query-title pair generator 720 may also generate metadata associated with each query-title pair. For example, the metadata may include a score associated with each query-title pair to indicate a degree of relevance between the query and the title. The query-title pair generator 720 may send the generated query-title pairs with their associated metadata to the parallel training data generator 730 for generating parallel training data.

The parallel training data generator 730 in this example may obtain the click graph from the click graph generator/updater 710 and obtain the query-title pairs from the query-title pair generator 720. The parallel training data generator 730 may generate, based on the query-title pairs and/or the click graph, parallel training data for training a query rewrite model. The parallel training data may include information about the query-title pairs, and other information like metadata associated with each query-title pair. In one embodiment, the metadata associated with each query-title pair may be generated by the parallel training data generator 730 rather than by the query-title pair generator 720. For example, the parallel training data may also include information like query submission time, profiles of users submitting the queries, users' remarks related to the web documents, etc. The parallel training data generator 730 may store the parallel training data into the training data database 735.

The query rewrite model learner 740 in this example may retrieve the parallel training data from the training data database 735 and generate a query rewrite model based on the parallel training data, e.g. via a machine learning algorithm. In one embodiment, the query rewrite model may be in form of a table as shown in FIG. 6, such that an original phrase can be translated into a translated phrase with an associated score. The query rewrite model learner 740 may store the query rewrite model into the query rewrite model database 155, and update it periodically based on new training data in the training data database 735. In one embodiment, the query rewrite model learner 740 may generate multiple versions of the query rewrite model and store them into the query rewrite model database 155. Different versions of the model may have been generated based on different training data, or different granularities of training data. For example, one version may be generated without considering user profiles of the users related to the training data, while another version may be generated by considering the user profiles.

The rewritten query generator 750 in this example may receive a query rewrite request for rewriting a query, e.g. from the search engine 130. The rewritten query generator 750 may retrieve the query rewrite model from the query rewrite model database 155 and generate a rewritten query based on the query and the query rewrite model. In one embodiment, the rewritten query generator 750 will select one version of the query rewrite model based on the query rewrite request, and generate a rewritten query based on the query and the selected version of the query rewrite model.

In another embodiment, the rewritten query generator 750 may generate more than one rewritten query in response to the query rewrite request. The rewritten query generator 750 may provide the one or more rewritten queries, e.g. to the search engine 130, in response to the query rewrite request.

Figure 8:
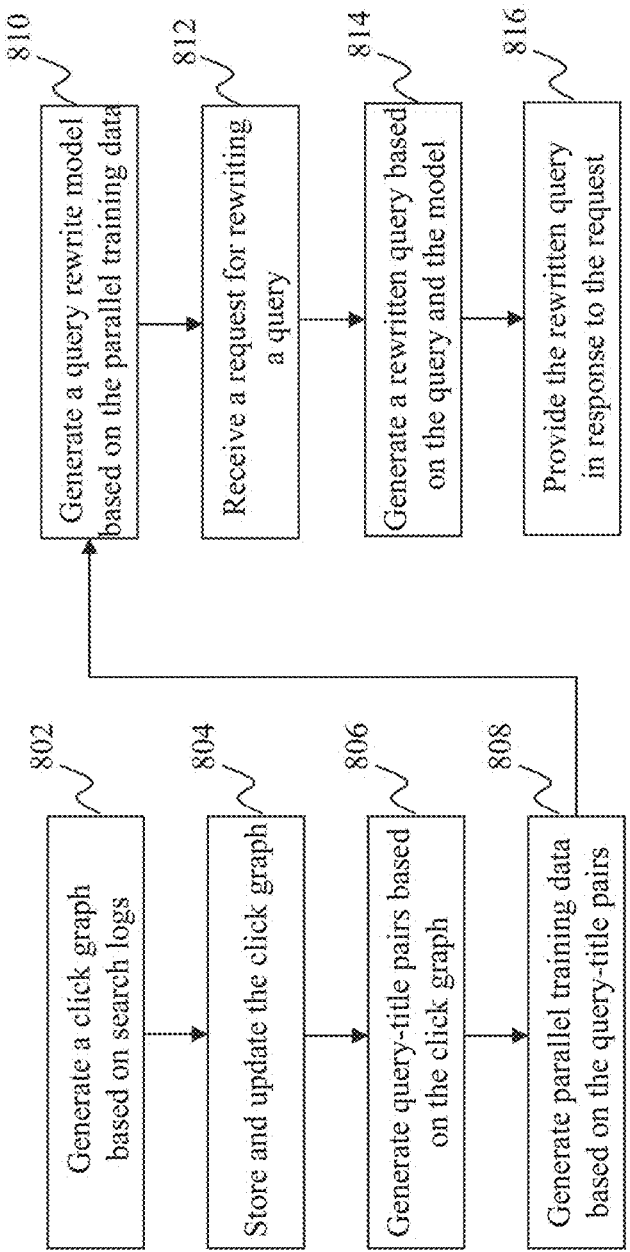
FIG. 8 is a flowchart of an exemplary process performed by a query rewrite engine, according to an embodiment of the present teaching.

FIG. 8 is a flowchart of an exemplary process performed by a query rewrite engine, e.g. the query rewrite engine 140 in FIG. 7, according to an embodiment of the present teaching. A click graph is generated at 802 based on one or more search logs. At 804, the click graph is stored and updated periodically. A plurality of query-title pairs are generated based on the click graph at 806. At 808, parallel training data are generated based on the query-title pairs.

A query rewrite model is generated based on the parallel training data at 810. A request is received at 812 for rewriting a query, e.g. from a search engine. At 814, a rewritten query is generated based on the query and the query rewrite model. The rewritten query is provided at 816, e.g. to the search engine, in response to the request.

Figure 9:
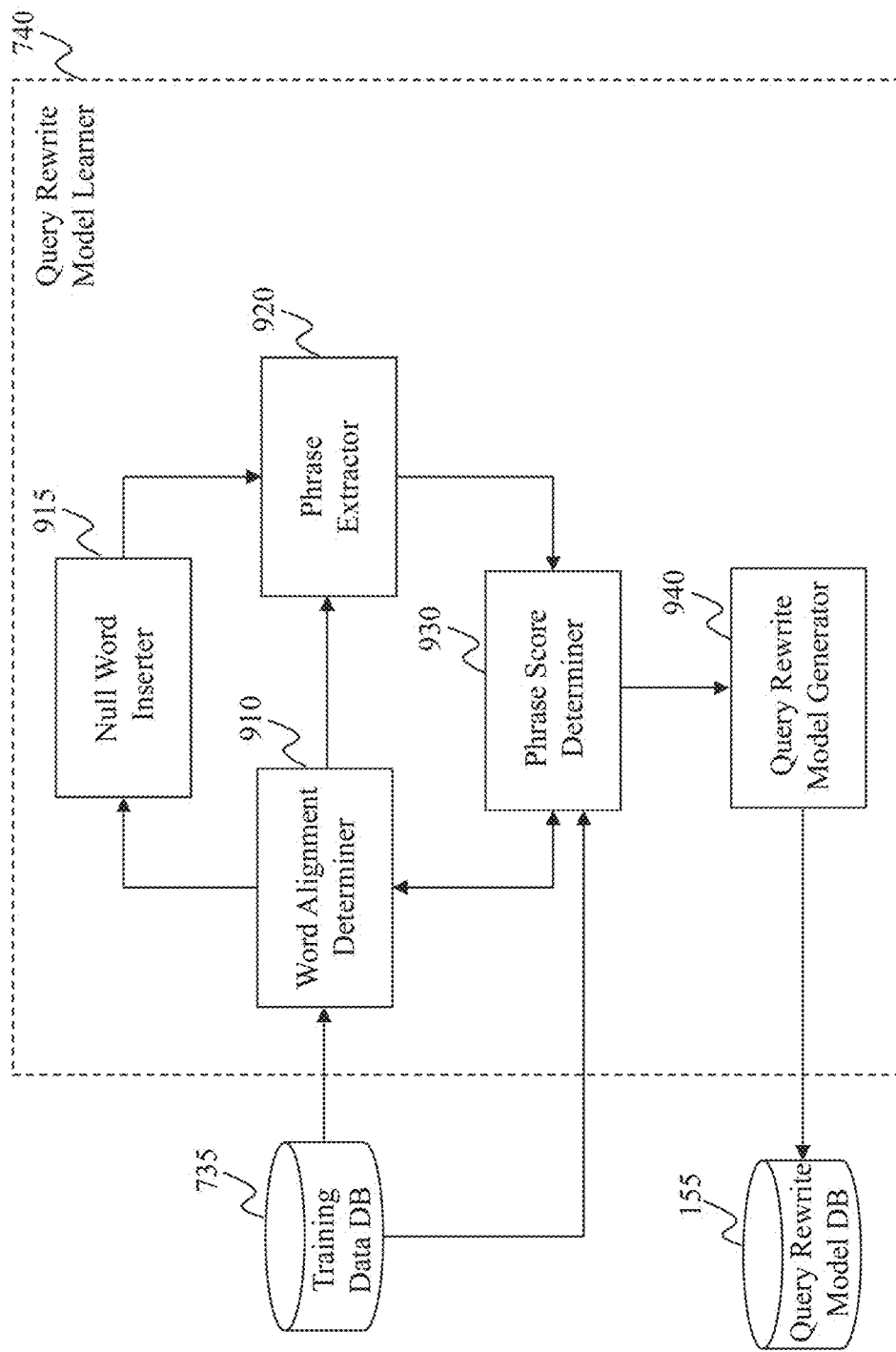
FIG. 9 illustrates an exemplary diagram of a query rewrite model learner, according to an embodiment of the present teaching.

FIG. 9 illustrates an exemplary diagram of a query rewrite model learner 740, according to an embodiment of the present teaching. As shown in FIG. 9, the query rewrite model learner 740 in this example includes a word alignment determiner 910, a null word inserter 915, a phrase extractor 920, a phrase score determiner 930, and a query rewrite model generator 940.

The word alignment determiner 910 in this example can retrieve parallel training data from the training data database 735. As discussed above, the training data may include a plurality of query-title pairs each of which comprises a query previously submitted by a user and a title of a document or a URL searched out in response to the query. For each query-title pair, the word alignment determiner 910 can determine one or more alignment candidates. For example, the query "how much Tesla" may be aligned with the title "price Tesla" in various manners. In one case, "how much" is aligned with "price"; and "Tesla" is aligned with "Tesla". In another case, "how" is aligned with "price"; and "much Tesla" is aligned with "Tesla". The word alignment determiner 910 may send the different alignment candidates to the null word inserter 915 for inserting null-words and to the phrase extractor 920 for extracting phrases.

The null word inserter 915 in this example may determine whether an alignment candidate needs null-words. If so, the null word inserter 915 can insert one or more null-words for the word alignment candidate. Because titles are usually longer than queries, some alignment candidate may need a null-word inserted for the alignment. A null-word may be a meaningless word that can be inserted into a query or a title for full alignment. For example, the query "how much Tesla" is to be aligned with the title "price Tesla 2016". While "how much" is aligned with "price" and "Tesla" is aligned with "Tesla", a null-word NULL may be inserted into the query to be aligned with "2016". The null word inserter 915 may send the alignment candidates that have been inserted with null-words when needed, to the phrase extractor 920 for extracting phrases.

The phrase extractor 920 in this example may receive various word alignment candidates from the word alignment determiner 910 or null-word inserted alignment candidates from the null word inserter 915, and extract phrases based on each word alignment candidate. As a result, the phrase extractor 920 can generate one or more phrase pairs based on each alignment candidate of a query-title pair. For an exemplary alignment candidate of the query-title pair of "how much Tesla" and "price Tesla 2016", the phrase extractor 920 may generate the following phrase pairs: "how much— price", "Tesla—Tesla", and "NULL—2016". In one embodiment, the phrase extractor 920 may extract phrases before the null word inserter 915 inserts the null-words, and adds the null-words received from the null word inserter 915 into the generated phrase pairs. The phrase extractor 920 may send the phrase pairs to the phrase score determiner 930 for determining scores for the phrase pairs.

The phrase score determiner 930 in this example can determine a score for each extracted phrase pair received from the phrase extractor 920. For example, the score may be a real number or a probability number representing likelihood for the two phrases to have a same meaning. In another example, the score may be a real number or a probability number representing how likely that one phrase will be in a title of a document in response to a query including the other phrase. The score may be determined based on a degree of relevance between the phrases in the pair, e.g. based on a weight of an edge linking a query-title pair related to the phrase pair in a click graph as shown in FIG. 4. The phrase score determiner 930 can obtain the degrees of relevance from the training data database 735. In one embodiment, the phrase score determiner 930 may adjust the null-word alignment probability, e.g. to a relative large or small value, to filter out noisy alignments. The phrase score determiner 930 can send the scores back to the word alignment determiner 910 for determining a word alignment for each query-title pair.

The word alignment determiner 910 may select or determine one of the alignment candidates generated for each query-title pair, e.g. based on the scores for each phrase pair generated from the query-title pair. For example, the word alignment determiner 910 may determine an aggregate score for each of the alignment candidates based on a minimum of the scores, a maximum of the scores, a sum of the scores, a product of the scores, or a weighted average of the scores of the phrase pairs. Then the word alignment determiner 910 can select one of the alignment candidates based on their respective aggregate scores, e.g. by selecting the alignment candidate with the largest aggregate score. The word alignment determiner 910 may send the determined alignment to the phrase score determiner 930; and the phrase score determiner 930 may send the determined alignment with the corresponding aggregate score and phrase pair scores to the query rewrite model generator 940. In one embodiment, the phrase score determiner 930, rather than the word alignment determiner 910, may determine the alignment, e.g. by calculating the aggregate scores for the alignment candidates, and send the determined alignment with the corresponding aggregate score and phrase pair scores to the query rewrite model generator 940.

The query rewrite model generator 940 in this example may generate a query rewrite model based on the extracted phrase pairs corresponding to each determined alignment for each query-title pair. In one example, the query rewrite model may be in form of a table as shown in FIG. 6, with the score for each phrase pair filled therein. The query rewrite model may be utilized to translate or rewrite an original phrase to a translated phrase, with an associated score as shown in FIG. 6. The query rewrite model generator 940 may store the query rewrite model into the query rewrite model database 155 for future use.

Figure 10:
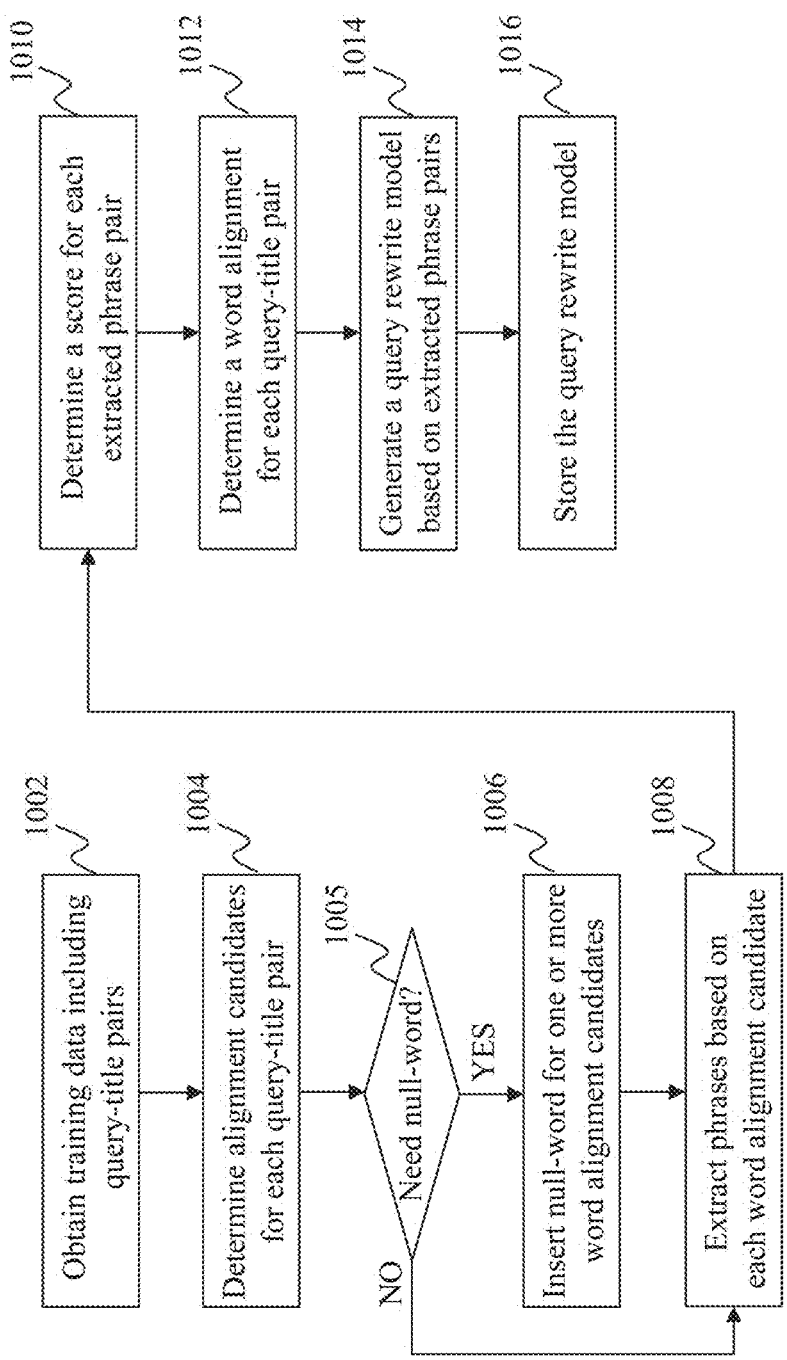
FIG. 10 is a flowchart of an exemplary process performed by a query rewrite model learner, according to an embodiment of the present teaching.

FIG. 10 is a flowchart of an exemplary process performed by a query rewrite model learner, e.g. the query rewrite model learner 740 in FIG. 9, according to an embodiment of the present teaching. At 1002, training data including query-title pairs are obtained. One or more alignment candidates are determined at 1004 for each query-title pair. At 1005, it is determined whether an alignment candidate needs to insert null-word. If so, one or more null-words are inserted at 1006 for the word alignment candidate, and the process moves to 1008. Otherwise, the process moves to 1008 directly. At 1008, one or more phrases are extracted based on each word alignment candidate for each query-title pair, to generate phrase pairs.

A score is determined at 1010 for each phrase pair. Based on scores of phrase pairs for the respective word alignment candidates, a word alignment is determined at 1012 for each query-title pair. A query rewrite model is generated at 1014 based on extracted phrase pairs corresponding to the determined word alignment for each query-title pair. At 1016, the query rewrite model is stored for future use, e.g. rewriting a query.

Figure 11:
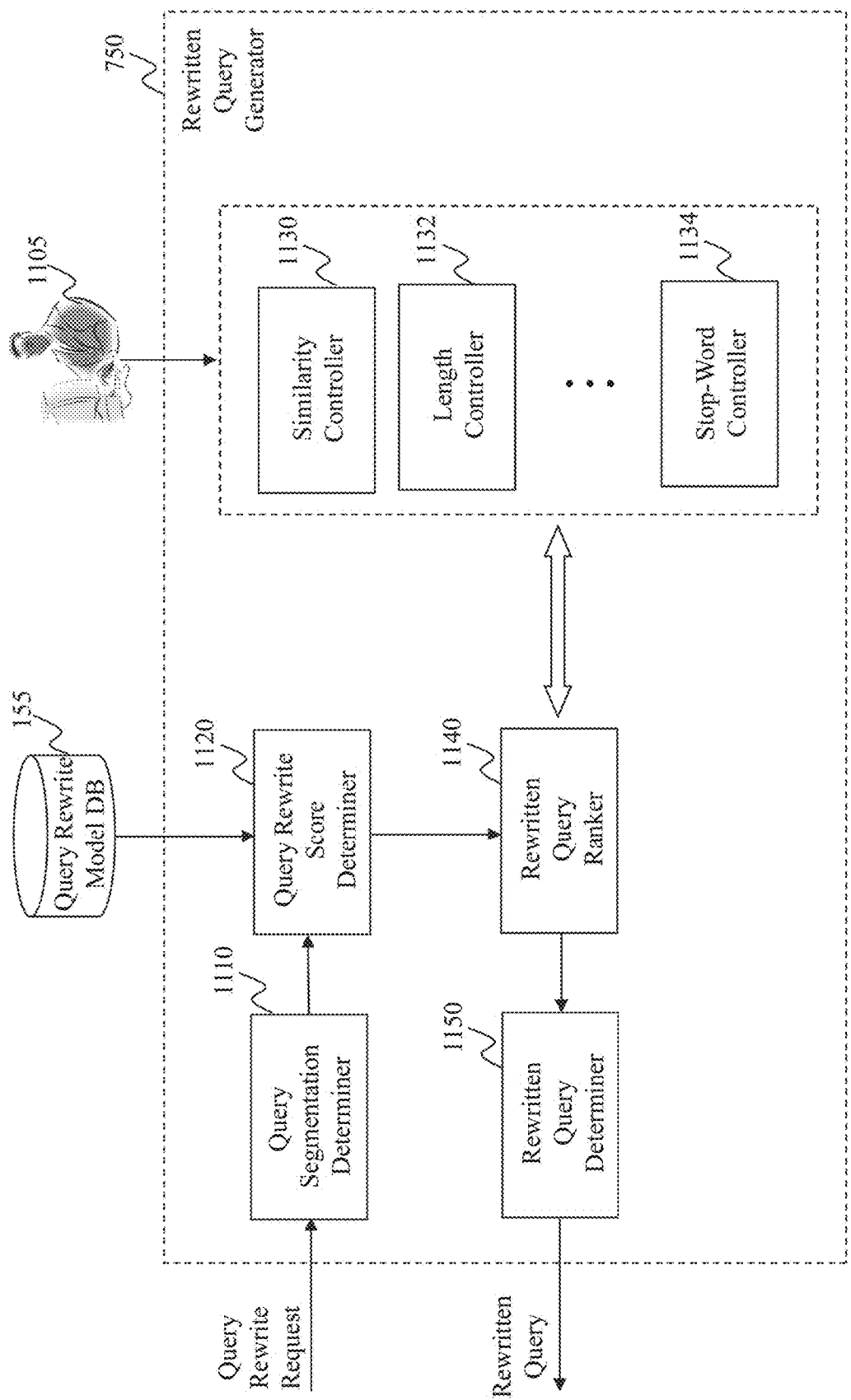
FIG. 11 illustrates an exemplary diagram of a rewritten query generator, according to an embodiment of the present teaching.

FIG. 11 illustrates an exemplary diagram of a rewritten query generator 750, according to an embodiment of the present teaching. As shown in FIG. 11, the rewritten query generator 750 in this example includes a query segmentation determiner 1110, a query rewrite score determiner 1120, a similarity controller 1130, a length controller 1132, a stop-word controller 1134, a rewritten query ranker 1140, and a rewritten query determiner 1150.

The query segmentation determiner 1110 in this example may receive a query rewrite request for rewriting a query, e.g. from the search engine 130. Based on the request, the query segmentation determiner 1110 may determine one or more segmentation candidates for the query, and identify phrases for each segmentation candidate. This is because there could be many ways to segment the query into phrases. For example, "how much Tesla" may be segmented as "how much/Tesla" or "how/much/Tesla". The query segmentation determiner 1110 can send the identified phrases for each segmentation candidate to the query rewrite score determiner 1120 for phrase translating.

The query rewrite score determiner 1120 in this example may receive the identified phrases from the query segmentation determiner 1110 and determine one or more translated phrases for each identified phrase, e.g. based on a table shown in FIG. 6. In general, the query rewrite score determiner 1120 may retrieve a query rewrite model from the query rewrite model database 155 and perform the phrase translating based on the query rewrite model. For each phrase translation, the query rewrite score determiner 1120 can also determine a score based on the query rewrite model, e.g. a score shown in a corresponding location in the table in FIG. 6. Based on the translated phrases, the query rewrite score determiner 1120 can determine one or more rewritten query candidates for the query. Each rewritten query candidate may include a corresponding set of translated phrases. The query rewrite score determiner 1120 may determine an aggregate score for each rewritten query candidate based on scores of the corresponding set of translated phrases. For example, the aggregate score may be a minimum of the scores, a maximum of the scores, a sum of the scores, a product of the scores, or a weighted average of the scores of the corresponding set of translated phrases. The query rewrite score determiner 1120 may send the one or more rewritten query candidates to the rewritten query ranker 1140 along with their respective aggregate scores.

The rewritten query ranker 1140 in this example can rank the rewritten query candidates received from the query rewrite score determiner 1120, based on their respective aggregate scores. In one embodiment, the rewritten query ranker 1140 may also perform the ranking based on some feature functions related to query rewriting. These feature functions may be preconfigured by a manager 1105 of the system. For example, these feature functions may comprise a similarity penalty function determined by the similarity controller 1130, a length penalty function determined by the length controller 1132, a stop-word penalty function determined by the stop-word controller 1134, etc.

The similarity controller 1130 in this example can control a word-level similarity between a rewritten candidate and the query. This is because treating query rewriting as a machine translation problem makes it monolingual. In many cases, the best candidate is identical to the original query. Therefore, it is desirable to introduce a feature function of similarity penalty to control the word-level similarity between the candidate and the query. For example, query candidates A and B have the same aggregate score calculated by the query rewrite score determiner 1120; while the original query is identical to query candidate A but is different from query candidate B. In this case, the system may rank query candidate B higher than query candidate A. For example, the rewritten query ranker 1140 may decrease the aggregate score of the query candidate A or increase the aggregate score of the query candidate B, either by a percentage or by a fixed number. The similarity controller 1130 here may determine the percentage or the fixed number, e.g. based on an instruction received from the manager 1105.

The length controller 1132 in this example can control a length of a rewritten candidate. This is because long queries are usually too specific and it is desirable to make the long query candidates relatively short. While short queries are usually too general, it is desirable to slightly increase their lengths. To fulfill this goal, the length controller 1132 implements a feature function of length penalty to control the length of a rewritten candidate. For example, for an original query shorter than a first threshold, the rewritten query ranker 1140 may increase the aggregate score of a query candidate longer than a second threshold, and/or decrease the aggregate score of a query candidate shorter than a third threshold, either by a percentage or by a fixed number. For an original query longer than a fourth threshold, the rewritten query ranker 1140 may decrease the aggregate score of a query candidate longer than a fifth threshold, and/or increase the aggregate score of a query candidate longer than a sixth threshold, either by a percentage or by a fixed number. The length controller 1132 here may determine the percentage, the fixed number, and the thresholds, e.g. based on an instruction received from the manager 1105.

The stop-word controller 1134 in this example can control the number of stop-words in rewritten query candidates. This is because stop-words in queries could degrade the retrieval and search performance. A stop-word may be a word like "a", "an", "the" in a query or query rewrite candidate. In some scenarios, the phrase translation may introduce more stop-words. As such, it is desirable to develop a feature function to penalize the number of stop-words in query rewrite candidates. For example, the rewritten query ranker 1140 may increase the aggregate score of a query candidate if its number of stop-words is less than a threshold, and/or decrease the aggregate score of a query candidate if its number of stop-words is greater than a threshold, either by a percentage or by a fixed number. The length controller 1132 here may determine the percentage, the fixed number, and the thresholds, e.g. based on an instruction received from the manager 1105.

In one embodiment, after the rewritten query ranker 1140 ranks the rewritten query candidates based on their respective aggregate scores received from the query rewrite score determiner 1120, the rewritten query ranker 1140 can determine whether to modify their rankings based on one or more of the feature functions described above. If so, the rewritten query ranker 1140 may modify their rankings and generate a ranked list of rewritten query candidates. Each rewritten query candidate in the ranked list may be associated with a final score that is generated based on its corresponding aggregate score and one or more modifications using some feature functions if applicable. The rewritten query ranker 1140 may send the ranked list of rewritten query candidates along with their respective final scores to the rewritten query determiner 1150 for determining a rewritten query.

The rewritten query determiner 1150 in this example may receive the ranked list of rewritten query candidates along with their respective final scores from the rewritten query ranker 1140, and select one or more of the rewritten query candidates based on their respective final scores. In one embodiment, the rewritten query determiner 1150 may just select the top ranked rewritten query candidate as the rewritten query. In another embodiment, the rewritten query determiner 1150 may select one or more top ranked rewritten query candidates whose final scores are above a predetermined threshold, to be the one or more rewritten queries. After determining one or more rewritten queries for the original query, the rewritten query determiner 1150 may provide the one or more rewritten queries, e.g. to the search engine 130, in response to the request for rewriting the original query.

Figure 12:
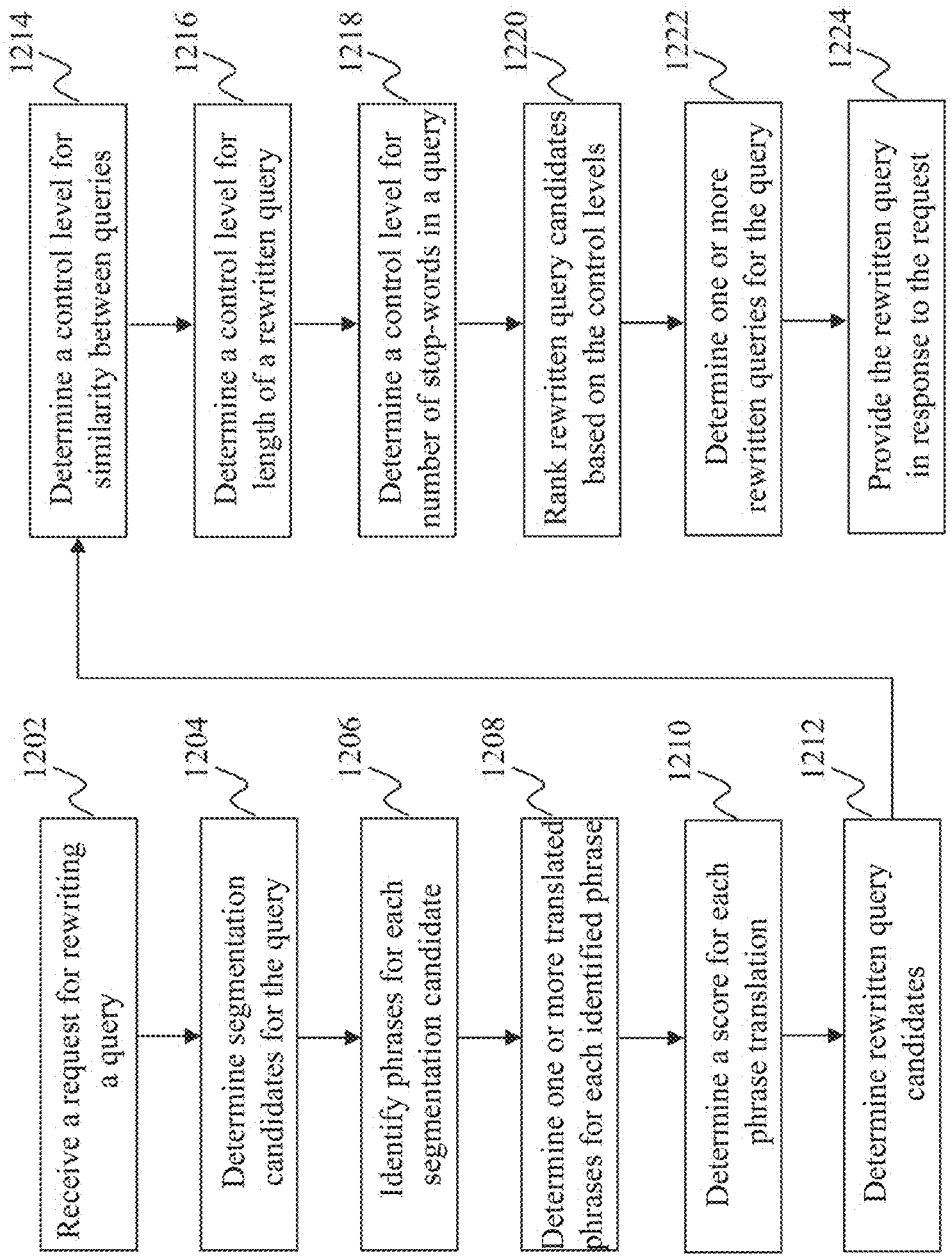
FIG. 12 is a flowchart of an exemplary process performed by a rewritten query generator, according to an embodiment of the present teaching.

FIG. 12 is a flowchart of an exemplary process performed by a rewritten query generator, e.g. the rewritten query generator 750 in FIG. 11, according to an embodiment of the present teaching. A request is received at 1202 for rewriting a query. One or more segmentation candidates are determined at 1204 for the query. One or more phrases are identified at 1206 for each segmentation candidate. One or more translated phrases are determined at 1208 for each identified phrase. A score is determined at 1210 for each phrase translation. Rewritten query candidates are determined at 1212, based on a corresponding set of translated phrases.

A control level is determined at 1214 for similarity between the original query and a rewritten query. A control level is determined at 1216 for length of a rewritten query. A control level is determined at 1218 for the number of stop-words in a rewritten query. Rewritten query candidates are ranked at 1220 based on the control levels and/or an aggregate score related to each rewritten query candidate. One or more rewritten queries are determined at 1222 for the query based on the ranked rewritten query candidates. At 1224, the one or more rewritten queries are provided in response to the request.

Figure 13:
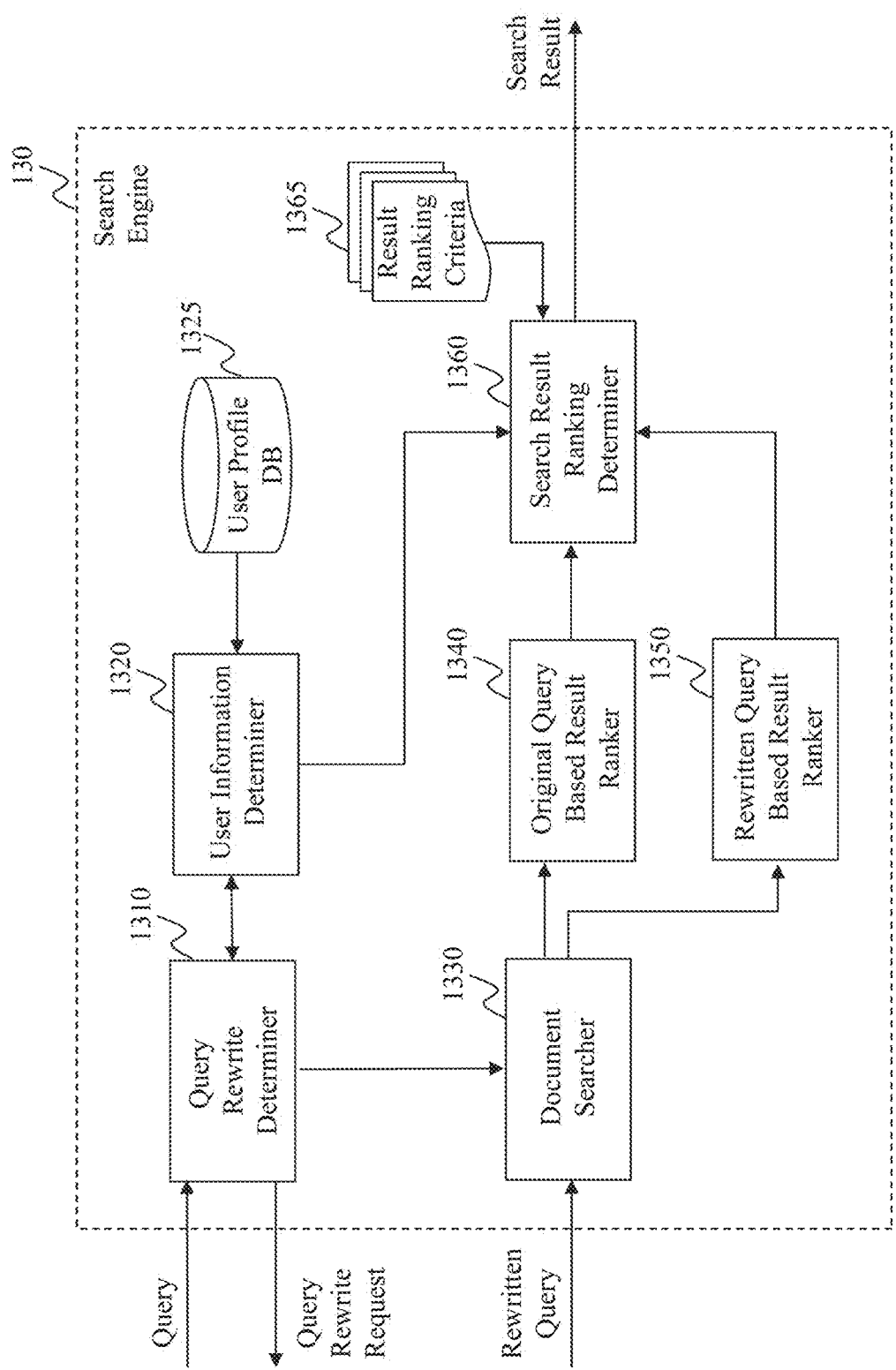
FIG. 13 illustrates an exemplary diagram of a search engine, according to an embodiment of the present teaching.

FIG. 13 illustrates an exemplary diagram of a search engine 130, according to an embodiment of the present teaching. As shown in FIG. 13, the search engine 130 in this example includes a query rewrite determiner 1310, a user information determiner 1320, a user profile database 1325, a document searcher 1330, an original query based result ranker 1340, a rewritten query based result ranker 1350, a search result ranking determiner 1360, and one or more result ranking criteria 1365 stored in the search engine 130.

The query rewrite determiner 1310 in this example may receive a query from a user for searching online content. The query rewrite determiner 1310 may determine whether to perform a query rewrite for the query. In one embodiment, the query rewrite determiner 1310 may inform the user information determiner 1320 to determine user information of the user and forward the user information to the query rewrite determiner 1310. The query rewrite determiner 1310 may then determine whether to rewrite the query based on the user information. When the query rewrite determiner 1310 determines that the query needs to be rewritten, the query rewrite determiner 1310 can generate and send a query rewrite request to the query rewrite engine 140 for rewriting the query. In one embodiment, the query rewrite request may include information about the query and user information of the user. When the query rewrite determiner 1310 determines that the query needs not to be rewritten, the query rewrite determiner 1310 will not send the query rewrite request. Whether the query needs to be rewritten or not, the query rewrite determiner 1310 may send the query to the document searcher 1330 for searching online documents. In one embodiment, the query rewrite determiner 1310 may inform the document searcher 1330 that the query will be rewritten.

The user information determiner 1320 in this example may retrieve a user profile of the user from the user profile database 1325, e.g. upon receiving an instruction from the query rewrite determiner 1310. Based on the user profile, the user information determiner 1320 can determine user information of the user, including e.g. demographic information of the user, search history of the user, search-related preference of the user, etc. The user information determiner 1320 may send the user information to the query rewrite determiner 1310 for determining whether to rewrite the query, and to the search result ranking determiner 1360 for ranking search results.

The document searcher 1330 in this example may receive a query from the query rewrite determiner 1310 for searching online content. This is an original query submitted by a user. The document searcher 1330 may search online content, e.g. online documents, based on the original query, and send the searched documents to the original query based result ranker 1340 for ranking. In one embodiment, the document searcher 1330 may receive one or more rewritten queries corresponding to the original query from the query rewrite engine 140. The one or more rewritten queries may be generated based on the original query, in accordance with a query rewrite model as discussed above. The document searcher 1330 can search online content, e.g. online documents, based on the one or more rewritten queries, and send the searched documents to the rewritten query based result ranker 1350 for ranking.

The original query based result ranker 1340 in this example may rank the searched documents generated based on the original query. The ranking may be performed based on popularity of the documents, a degree of matching between the original query and the searched document, etc. The original query based result ranker 1340 may generate a first ranked list of searched documents to the search result ranking determiner 1360.

The rewritten query based result ranker 1350 in this example may rank the searched documents generated based on the one or more rewritten queries. The ranking may be performed based on popularity of the documents, a degree of matching between a rewritten query and the searched document, an aggregate score associated with each rewritten query, etc. The rewritten query based result ranker 1350 may generate a second ranked list of searched documents to the search result ranking determiner 1360.

The search result ranking determiner 1360 in this example may generate and rank search results in response to the original query. In one embodiment, at least some of the search results are generated based on the one or more rewritten queries. The search result ranking determiner 1360 may retrieve one of the result ranking criteria 1365 to rank the search results that may include both the first ranked list of searched documents and the second ranked list of searched documents. In one embodiment, the search result ranking determiner 1360 may generate search results ranking merely based on the second ranked list of searched documents, i.e. the search results are all generated based on one or more rewritten queries. In another embodiment, the search result ranking determiner 1360 may generate search results that combine the two ranked lists of searched documents. For example, each document in the two ranked lists has a ranking score based on which the ranking was generated in each list. If a document is included in both lists and has ranking scores of S1 and S2 respectively in the two lists, the search result ranking determiner 1360 may generate an aggregate ranking score for the document, e.g. based on a maximum of S1 and S2. If a document is included in only one of the two lists and has ranking scores of S, the search result ranking determiner 1360 may generate an aggregate ranking score for the document, e.g. based on S, or S/2. The search result ranking determiner 1360 may generate search results based on only documents having an aggregate ranking score higher than a threshold. The search result ranking determiner 1360 can rank the documents in the search results based on their respective aggregate ranking scores, to generate a final list of ranked search results. The search result ranking determiner 1360 may provide the ranked search results to the user, in response to the original query submitted by the user.

Figure 14:
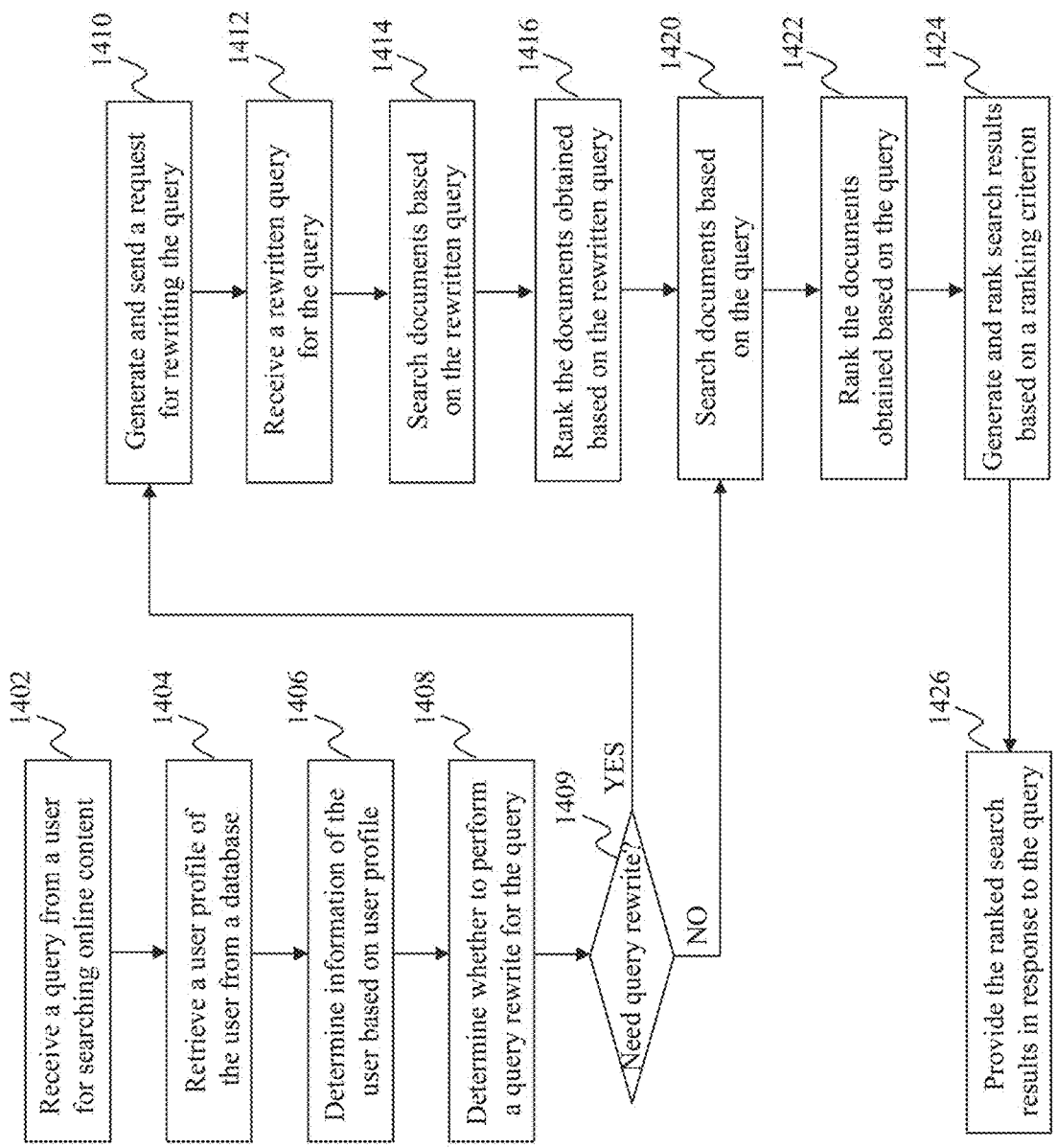
FIG. 14 is a flowchart of an exemplary process performed by a search engine, according to an embodiment of the present teaching.

FIG. 14 is a flowchart of an exemplary process performed by a search engine, e.g. the search engine 130 in FIG. 13, according to an embodiment of the present teaching. A query is received at 1402 from a user for searching online content. A user profile of the user is retrieved at 1404 from a database. Information of the user is determined at 1406 based on the user profile. At 1408, it is determined whether to perform a query rewrite for the query. The decision whether the query needs to be rewritten is made at 1409. If so, the process goes to 1410, where a request is generated and sent for rewriting the query. At 1412, a rewritten query is received for the query. Documents are searched at 1414 based on the rewritten query. At 1416, the searched documents obtained based on the rewritten query are ranked. The process then moves to 1420.

If the decision at 1409 is that the query does not need to be rewritten, the process goes to 1420 directly, where documents are searched based on the query. At 1422, the searched documents obtained based on the query are ranked. Search results are generated and ranked at 1424, based on a ranking criterion. In one embodiment, the search results include at least some documents searched based on the rewritten query. At 1426, the ranked search results are provided to the user in response to the query.

It can be understood that the order of the steps shown in each of FIG. 8, FIG. 10, FIG. 12, and FIG. 14 may be changed according to different embodiments of the present teaching.

Figure 15:
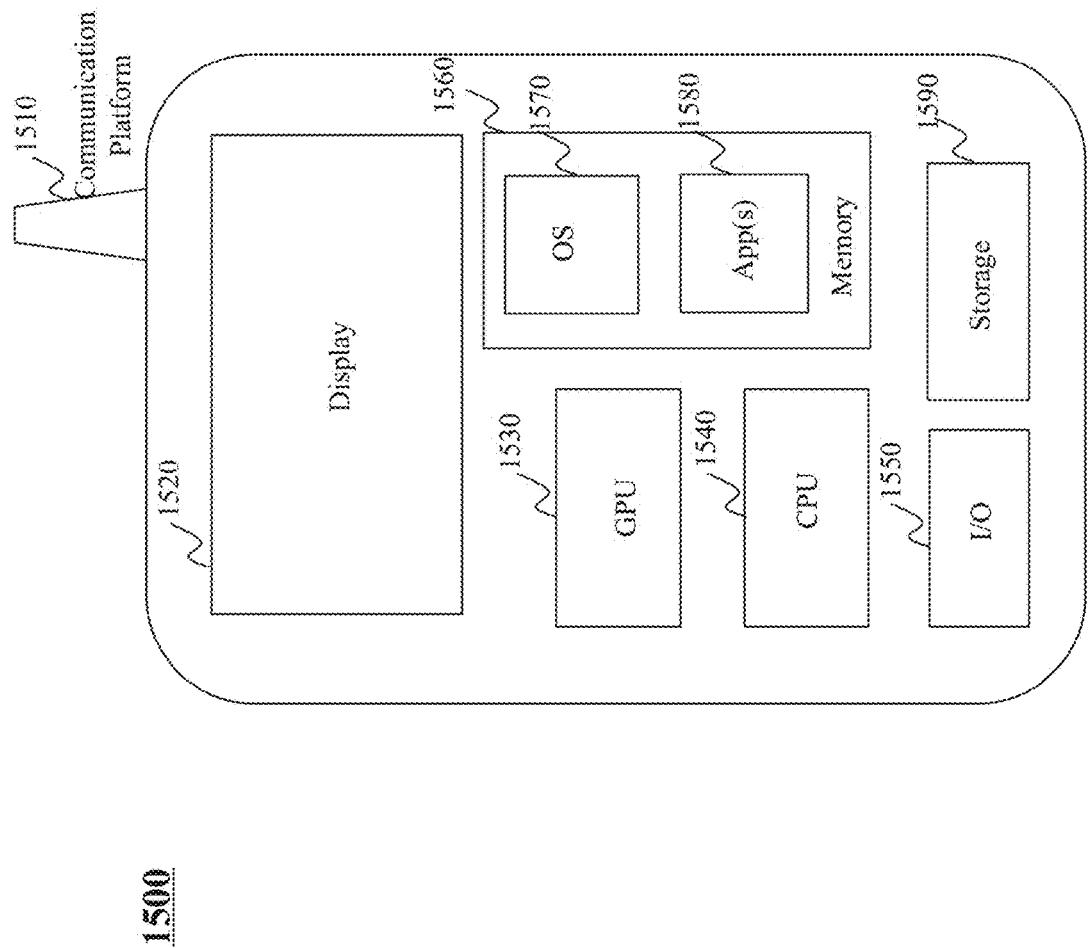
FIG. 15 depicts the architecture of a mobile device which can be used to implement a specialized system incorporating the present teaching.

FIG. 15 depicts the architecture of a mobile device which can be used to realize a specialized system implementing the present teaching. In this example, the user device on which a search result is presented and interacted-with is a mobile device 1500, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1500 in this example includes one or more central processing units (CPUs) 1540, one or more graphic processing units (GPUs) 1530, a display 1520, a memory 1560, a communication platform 1510, such as a wireless communication module, storage 1590, and one or more input/output (I/O) devices 1550. Any other suitable component, including but not limited to a system bus or a controller (not shown), may also be included in the mobile device 1500. As shown in FIG. 15, a mobile operating system 1570, e.g., iOS, Android, Windows Phone, etc., and one or more applications 1580 may be loaded into the memory 1560 from the storage 1590 in order to be executed by the CPU 1540. The applications 1580 may include a browser or any other suitable mobile apps for receiving search results on the mobile device 1500. User interactions with the search results may be achieved via the I/O devices 1550 and provided to the query rewrite engine 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the query rewrite engine 140, the search engine 130 and/or other components of systems 100 and 200 described with respect to FIGS. 1-12). The hardware elements, operating systems and programming languages of such computers are conventional in nature, and it is presumed that those skilled in the art are adequately familiar therewith to adapt those technologies about rewriting a query as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 16:
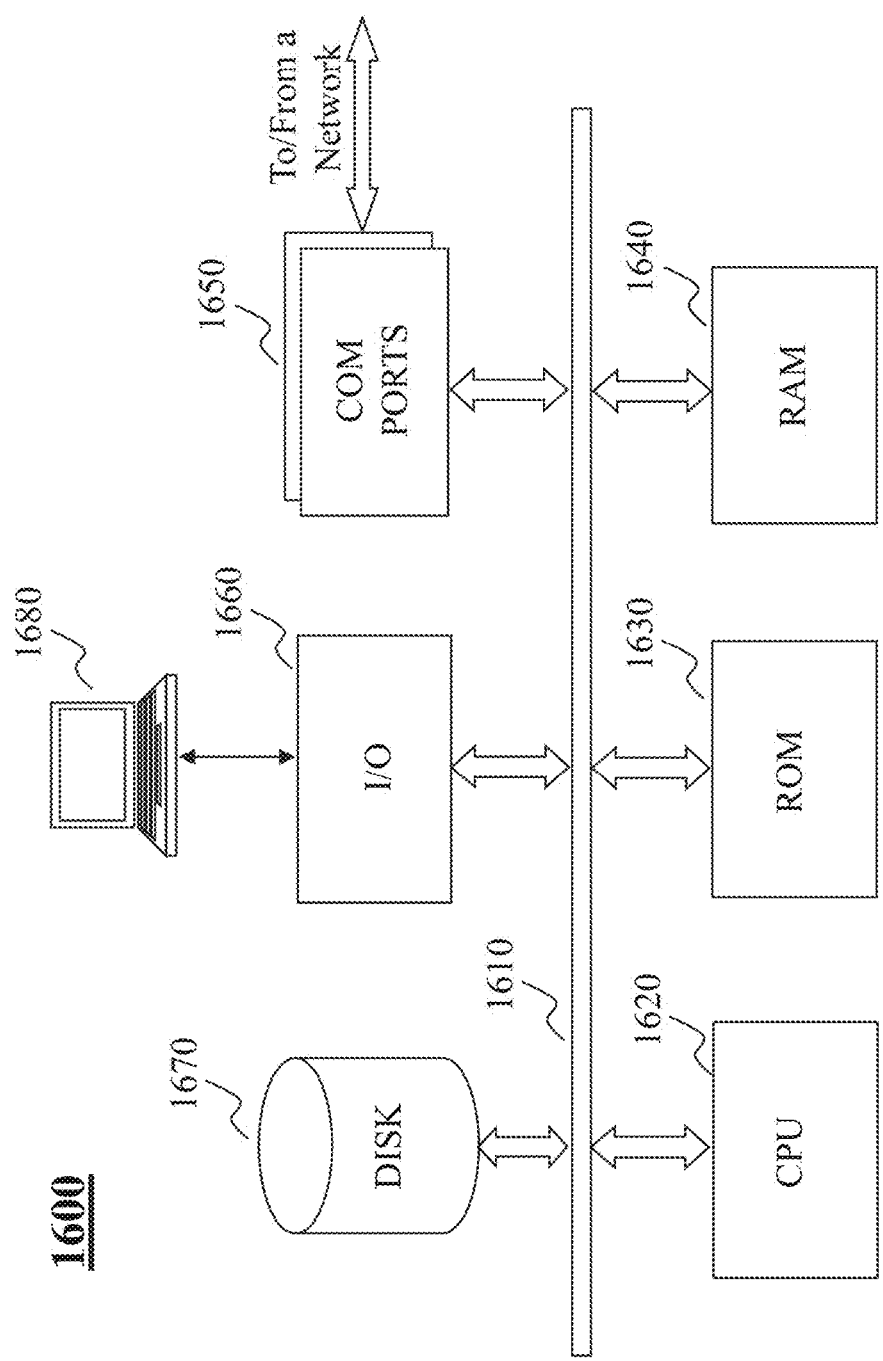
FIG. 16 depicts the architecture of a computer which can be used to implement a specialized system incorporating the present teaching.

FIG. 16 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1600 may be used to implement any component of the techniques of rewriting a query, as described herein. For example, the search engine 130, the query rewrite engine 140, etc., may be implemented on a computer such as computer 1600, via its hardware, software program, firmware, or a combination thereof. Although only one such computer is shown, for convenience, the computer functions relating to rewriting a query as described herein may be implemented in a distributed fashion on a number of similar platforms, to distribute the processing load.

The computer 1600, for example, includes COM ports 1650 connected to and from a network connected thereto to facilitate data communications. The computer 1600 also includes a central processing unit (CPU) 1620, in the form of one or more processors, for executing program instructions. The exemplary computer platform includes an internal communication bus 1610, program storage and data storage of different forms, e.g., disk 1670, read only memory (ROM) 1630, or random access memory (RAM) 1640, for various data files to be processed and/or communicated by the computer, as well as possibly program instructions to be executed by the CPU. The computer 1600 also includes an I/O component 1660, supporting input/output flows between the computer and other components therein such as user interface elements 1680. The computer 1600 may also receive programming and data via network communications.

Hence, aspects of the methods of rewriting a query, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with rewriting a query. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, rewriting a query as disclosed herein may be implemented as a firmware, firmware/software combination, firmware/hardware combination, or a hardware/firmware/ software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for rewriting a query, the method comprising:
   obtaining a plurality of queries;
   identifying, for each of the plurality of queries, one or more search results that were previously selected by a user with respect to the query;
   obtaining a plurality of titles each of which corresponds to each of the one or more search results;
   generating a query rewrite model based on a plurality of query-title pairs, wherein the plurality of query-title pairs are generated based on the plurality of queries, the plurality of titles, and a degree of relevance between each of the plurality of queries and a corresponding one of the plurality of titles as well as word alignment candidates for each of the plurality of query-title pairs, wherein at least one null-word is inserted into at least one of the word alignment candidates of the plurality of query-title pairs, and wherein the degree of relevance is estimated based on interactions of the user with respect to the one or more search results related to the query;
   receiving a new query;
   automatically generating, based on the query rewrite model and the new query, one or more rewritten queries; and
   obtaining a plurality of search results based on the one or more rewritten queries and the new query.

2. The method of claim 1, wherein generating the one or more rewritten queries comprises:
   determining segmentation candidates for the new query;
   identifying one or more phrases for each segmentation candidate;
   generating a translated phrase for each identified phrase based on the query rewrite model;
   determining rewritten query candidates based on the translated phrases;
   ranking the rewritten query candidates; and
   generating the one or more rewritten queries from the rewritten query candidates based on the ranking.

3. The method of claim 2, further comprising:
   determining a first control level for similarity between queries;
   determining a second control level for length of a rewritten query; and
   determining a third control level for a quantity of stop-words in a query, wherein the rewritten query candidates are ranked based on the first, second and third control levels.

4. The method of claim 1, further comprising:
   generating parallel training data based on the plurality of query-title pairs, wherein the query rewrite model is generated based on the parallel training data via a machine learning algorithm.

5. The method of claim 4, wherein generating the query rewrite model comprises:
   determining the word alignment candidates for each of the plurality of query-title pairs;
   extracting one or more phrase pairs from each of the plurality of query-title pairs based on each of the word alignment candidates;
   determining a score for each of the one or more extracted phrase pairs; and
   selecting at least one word alignment from the word alignment candidates based on the score determined for each of the one or more extracted phrase pairs corresponding to each of the word alignment candidates, wherein the query rewrite model is generated further based on extracted phrase pairs corresponding to the selected at least one word alignment.

6. The method of claim 1, wherein:
   the plurality of queries are obtained from one or more search logs; and
   the one or more search results are identified based on a click graph generated based on the one or more search logs, wherein the click graph represents relationships between queries and documents in the one or more search logs, wherein the interactions with which the degree of relevance is estimated from are extracted from the click graph.

7. The method of claim 1, wherein each of the plurality of titles represents a document or a Uniform Resource Locator (URL) corresponding to one of the one or more search results.

8. The method of claim 5, wherein the one or more phrase pairs are further extracted from each of the plurality of query-title pair based on each word alignment candidate including the at least one null-word inserted therein.

9. A method, implemented on a machine having at least one processor, storage, and a communication platform connected to a network for providing search results, the method comprising:
   receiving an original query for online content;
   generating a first set of search results based on the original query;
   generating a query rewrite model based on parallel training data comprising a plurality of query-title pairs, wherein each of the plurality of query-title pairs includes a query and a title corresponding to a search result that was previously selected by a user with respect to the query and one or more word alignment candidates for each of the plurality of query-title pairs, wherein each of the plurality of query-title pairs includes information regarding a degree of relevance between the query and the title, the degree of relevance being estimated based on interactions of the user with respect to the search result, wherein each of the one or more word alignment candidates aligns a word or phrase from a respective query to a word or phrase from respective title for each of the plurality of query-title pairs, and wherein at least one null-word is inserted into at least one of the word alignment candidates;
   obtaining a rewritten query based on the original query and the query rewrite model;
   generating a second set of search results based on the rewritten query;

generating a list of search results based on the first set of search results and the second set of search results; and providing the list of search results in response to the original query.

10. The method of claim 9, wherein the list of search results includes one or more search results from the second set of search results.

11. The method of claim 9, wherein generating the list of search results comprises:
   determining a first score for each search result in the first set of search results;
   determining a second score for each search result in the second set of search results;
   generating a combined score for each search result in the first set of search results and the second set of search results, wherein when the first set of search results and the second of search results both comprise a first search result, the combined score of the first search result is equal to a maximum of the first score and the second score of the first search result; and
   ranking the first set of search results and the second set of search results based on their respective combined scores to generate a ranked list of search results, wherein the list of search results is generated based on the ranked list of search results.

12. A system having at least one processor, storage, and a communication platform connected to a network for rewriting a query, comprising:
   a click graph generator/updater configured for:
      obtaining a plurality of queries, and
      identifying, for each of the plurality of queries, one or more search results that were previously selected by a user with respect to the query;
   a query-title pair generator configured for obtaining a plurality of titles each of which corresponds to each of the one or more search results;
   a query rewrite model learner configured for generating a query rewrite model based on a plurality of query-title pairs, wherein the plurality of query-title pairs are generated based on the plurality of queries, the plurality of titles, and a degree of relevance between each of the plurality of queries and a corresponding one of the plurality of titles as well as word alignment candidates for each of the plurality of query-title pairs, wherein at least one null-word is inserted into at least one of the word alignment candidates of the plurality of query-title pairs, and wherein the degree of relevance is estimated based on interactions of the user with respect to the one or more search results related to the query; and
   a rewritten query generator configured for:
      receiving a new query,
      automatically generating, based on the query rewrite model and the new query, one or more rewritten queries, and
      obtaining a plurality of search results based on the one or more rewritten queries and the new query.

13. The system of claim 12, wherein generating the one or more rewritten queries comprises:
   determining segmentation candidates for the new query;
   identifying one or more phrases for each segmentation candidate;
   generating a translated phrase for each identified phrase based on the query rewrite model;
   determining rewritten query candidates based on the translated phrases;
   ranking the rewritten query candidates; and
   generating the one or more rewritten queries from the rewritten query candidates based on the ranking.

14. The system of claim 13, wherein the rewritten query generator comprises:
   a similarity controller configured for determining a first control level for similarity between queries;
   a length controller configured for determining a second control level for length of a rewritten query; and
   a stop-word controller configured for determining a third control level for a quantity of stop-words in a query, wherein the rewritten query candidates are ranked based on the first, second and third control levels.

15. The system of claim 12, wherein the system further comprises:
   a parallel training data generator configured for generating parallel training data based on the plurality of query-title pairs, wherein the query rewrite model is generated based on the parallel training data via a machine learning algorithm.

16. The system of claim 15, wherein generating the query rewrite model comprises:
   determining the word alignment candidates for each of the plurality of query-title pairs;
   extracting one or more phrase pairs from each of the plurality of query-title pairs based on each of the word alignment candidates;
   determining a score for each of the one or more extracted phrase pairs; and
   selecting at least one word alignment from the word alignment candidates based on the score determined for each of the one or more extracted phrase pairs corresponding to each of the word alignment candidates, wherein the query rewrite model is generated further based on extracted phrase pairs corresponding to the selected at least one word alignment.

17. The system of claim 12, wherein:
   the plurality of queries are obtained from one or more search logs; and
   the one or more search results are identified based on a click graph generated based on the one or more search logs, wherein the click graph represents relationships between queries and documents in the one or more search logs, wherein the interactions with which the degree of relevance is estimated from are extracted from the click graph.

18. The system of claim 12, wherein each of the plurality of titles represents a document or a Uniform Resource Locator (URL) corresponding to one of the one or more search results.

19. A non-transitory machine-readable medium having information recorded thereon for rewriting a query, wherein the information, when read by the machine, causes the machine to perform operations comprising:
   obtaining a plurality of queries;
   identifying, for each of the plurality of queries, one or more search results that were previously selected by a user with respect to the query;
   obtaining a plurality of titles each of which corresponds to each of the one or more search results;
   generating a query rewrite model based on a plurality of query-title pairs, wherein the plurality of query-title pairs are generated based on the plurality of queries, the plurality of titles, and a degree of relevance between each of the plurality of queries and a corresponding one of the plurality of titles as well as word alignment candidates for each of the plurality of query-title pairs, wherein at least one null-word is inserted into at least one of the word alignment candidates of the plurality of query-title pairs, and wherein the degree of relevance is estimated based on interactions of the user with respect to the one or more search results related to the query;

receiving a new query;

automatically generating, based on the query rewrite model and the new query, one or more rewritten queries; and obtaining a plurality of search results based on the one or more rewritten queries and the new query.

20. The method of claim 1, further comprising:

generating one or more additional query rewrite models based on an additional plurality of queries and an additional plurality of titles each of which corresponds to each of one or more additional search results identified as having been selected by an additional user with respect to the additional query, wherein the query rewrite model is selected to rewrite the new query from a plurality of query rewrite models stored in a query rewrite model database based on the new query, wherein the query rewrite model database includes the query rewrite model and the one or more additional query rewrite models.

* * * * *